(12) United States Patent
Kuo

(10) Patent No.: US 11,099,614 B1
(45) Date of Patent: Aug. 24, 2021

(54) FUNCTION EXPANSION DEVICE AND ELECTRONIC DEVICE INCLUDING THE SAME

(71) Applicant: GETAC TECHNOLOGY CORPORATION, Hsinchu County (TW)

(72) Inventor: Hsiu-Yu Kuo, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/992,477

(22) Filed: Aug. 13, 2020

(51) Int. Cl.
*H05K 7/14* (2006.01)
*H05K 7/18* (2006.01)
*G06F 1/18* (2006.01)

(52) U.S. Cl.
CPC .............. *G06F 1/181* (2013.01); *G06F 1/185* (2013.01); *G06F 1/186* (2013.01)

(58) Field of Classification Search
USPC ................................ 361/796, 727, 800, 752
See application file for complete search history.

(56) References Cited

U.S. PATENT DOCUMENTS

| 6,229,708 | B1 * | 5/2001 | Corbin, Jr. | ........... | H05K 7/1431 |
| | | | | | 361/725 |
| 7,180,753 | B2 * | 2/2007 | Kerrigan | ................. | G06F 1/183 |
| | | | | | 361/724 |

* cited by examiner

*Primary Examiner* — Hung S. Bui

(57) ABSTRACT

A function expansion device and an electronic device including the same. The function expansion device includes a casing, an expansion device and a handle. The casing has a main space and a side space. The expansion device is accommodated in the main space of the casing. The handle is slidably disposed in the side space and is thus allowed to move between a housed position and an extracted position along a sliding direction of the casing by gravitational force. A first protruding length of the handle relative to the casing when the handle is at the housed position is less than a second protruding length of the handle relative to the casing when the handle is at the extracted position. When the handle is at the extracted position, the handle is pressed against the casing to enable the casing to be moved along with the handle.

17 Claims, 8 Drawing Sheets

FUNCTION EXPANSION DEVICE AND ELECTRONIC DEVICE INCLUDING THE SAME

BACKGROUND OF THE INVENTION

Field of the Invention

The present invention relates to a function expansion device and an electronic device including the same, and more particularly to a function expansion device having a handle and an electronic device including the same.

Description of the Prior Art

With the constant progress of information technologies, functions of personal computers, industrial computers, military laptop computers or digital electronic products can be expanded using expansion devices of various functions. These expansion devices are, for example, CD players, burners, hard drives, floppy drives and rechargeable batteries. However, compared to personal computers, industrial computers and military laptop computers demand more strict use requirements due to more strict use environments, for example, requirements in aspects such as waterproofness, dustproofness, lightweighting, thinning, and convenience for removal/installation of expansion devices.

Taking a solid-state drive (SSD) as the above expansion device for example, a current SSD is locked in a casing by a large amount of screws. If a user needs to frequently remove and install the SSD, such as needing to remove the SSD when the user gets off work and needing to again install the SSD when the user goes to work, the tedious operation process of detaching or locking the large amount of screws inevitably brings the user with significant inconvenience.

SUMMARY OF THE INVENTION

It is an objective the present invention to provide a function expansion device and an electronic device so as to enhance convenience in removal/installation of an expansion device.

A function expansion device disclosed according to an embodiment of the present invention includes a casing, an expansion device and a handle. The casing has a main space and a side space. The expansion device is accommodated in the main space of the casing. The handle is slidably disposed in the side space and is allowed to move between a housed position and an extracted position along a sliding direction of the casing by gravitational force. A first protruding length of the handle relative to the casing when the handle is at the housed position is less than a second protruding length of the handle relative to the casing when the handle is at the extracted position. When the handle is at the extracted position, the handle is pressed against the casing to enable the casing to be moved along with the handle.

An electronic device disclosed according to another embodiment of the present invention includes a host, a function expansion device and a cover. The host has an accommodating chamber and a slot. The function expansion device is detachably accommodated in the accommodating chamber, and includes a casing, an expansion device and a handle. The casing has a main space, a side space and an opening. The opening is in communication with the side space. The expansion device is accommodated in the main space of the casing. The handle is slidably disposed in the side space and is allowed to move between a housed position and an extracted position along a sliding direction of the casing by gravitational force. A first protruding length of the handle relative to the casing when the handle is at the housed position is less than a second protruding length of the handle relative to the casing when the handle is at the extracted position. When the handle is at the extracted position, the handle is pressed against the casing to enable the casing to be moved along with the handle. The cover is movably disposed in the host, and has an open position and a closed position. When the cover is at the closed position, the cover is fitted in the slot of the host and blocks the functional expansion device. When the cover is at the open position, the cover is disengaged from the slot of the host and the handle is exposed to the outside via the opening of the casing.

In the electronic device and the function expansion device according to the above embodiments, the handle is slidably disposed in the side space and is allowed to move between the housed position and the extracted position relative to the casing by gravitational force, and thus the handle can be moved from the housed position to the extracted position without being pulled and can further move the casing that accommodates the expansion device. Therefore, the removal/installation process of the expansion device does not require a tedious process of detaching/locking multiple screws, enabling the function expansion device to satisfy the need of convenient removal/installation of the expansion device.

Further, because a user is allowed to move the handle from the housed position to the extracted position by gravitational force without having to manually operate the handle, the handle can provide a lightweight and thin electronic device with convenience in removing/installing the expansion device.

Moreover, the cover blocks the function expansion device when located at the closed position, and so the cover is capable of preventing the handle from moving unexpectedly from the housed position to the extracted position. In addition, the cover that blocks the function expansion device also prevents alien objects such as moisture or dust from entering the casing via the opening of the casing and hence from affecting the operation of the function expansion device.

BRIEF DESCRIPTION OF THE DRAWINGS

FIG. 3 is an enlarged partial section diagram of the electronic device in

FIG. 1;

DETAILED DESCRIPTION OF THE EMBODIMENTS

Detailed features and advantages of the embodiments of the present invention are described in detail in the embodiments below for a person skilled in the art to thoroughly understand and accordingly implement techniques of the embodiments of the present invention. On the basis of the contents, claims and drawings disclosed by the present application, a person skilled in the art can easily understand related objectives and advantages of the present invention. It should be noted that, the embodiments below are for further illustrating aspects of the present invention and are not to be construed as limiting the scope of the present invention by any of the aspects.

Figure 1:
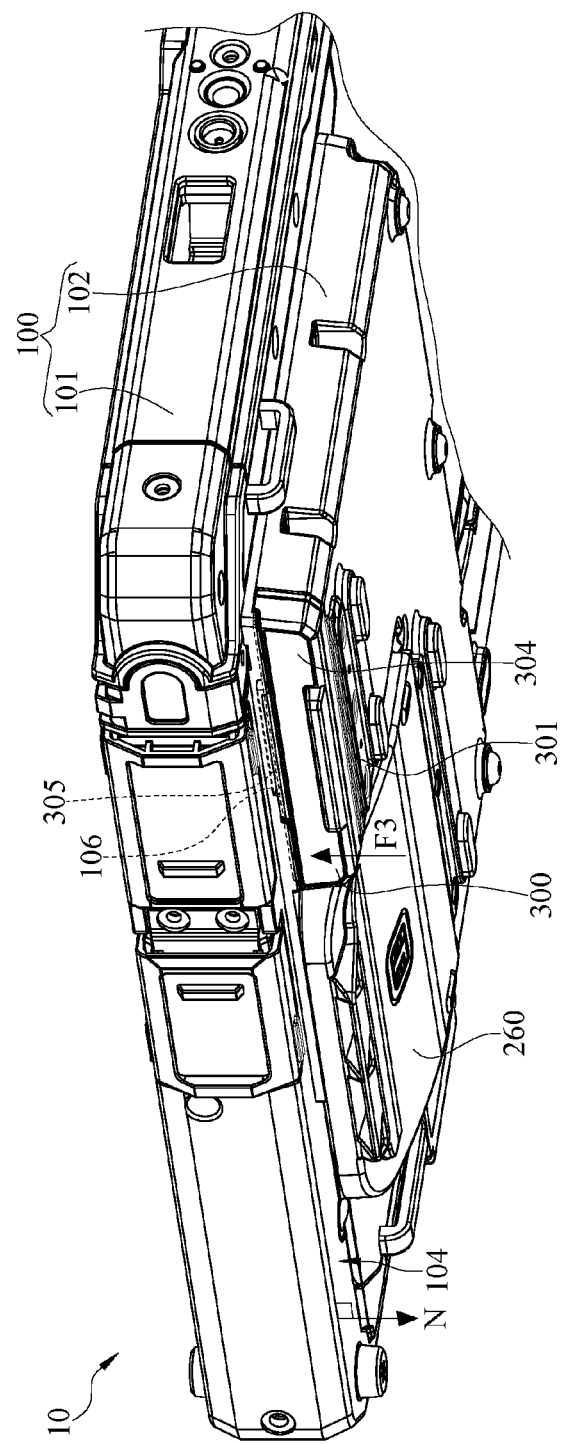
FIG. 1 is an enlarged partial three-dimensional diagram of an electronic device according to an embodiment of the present invention.
Figure 2:
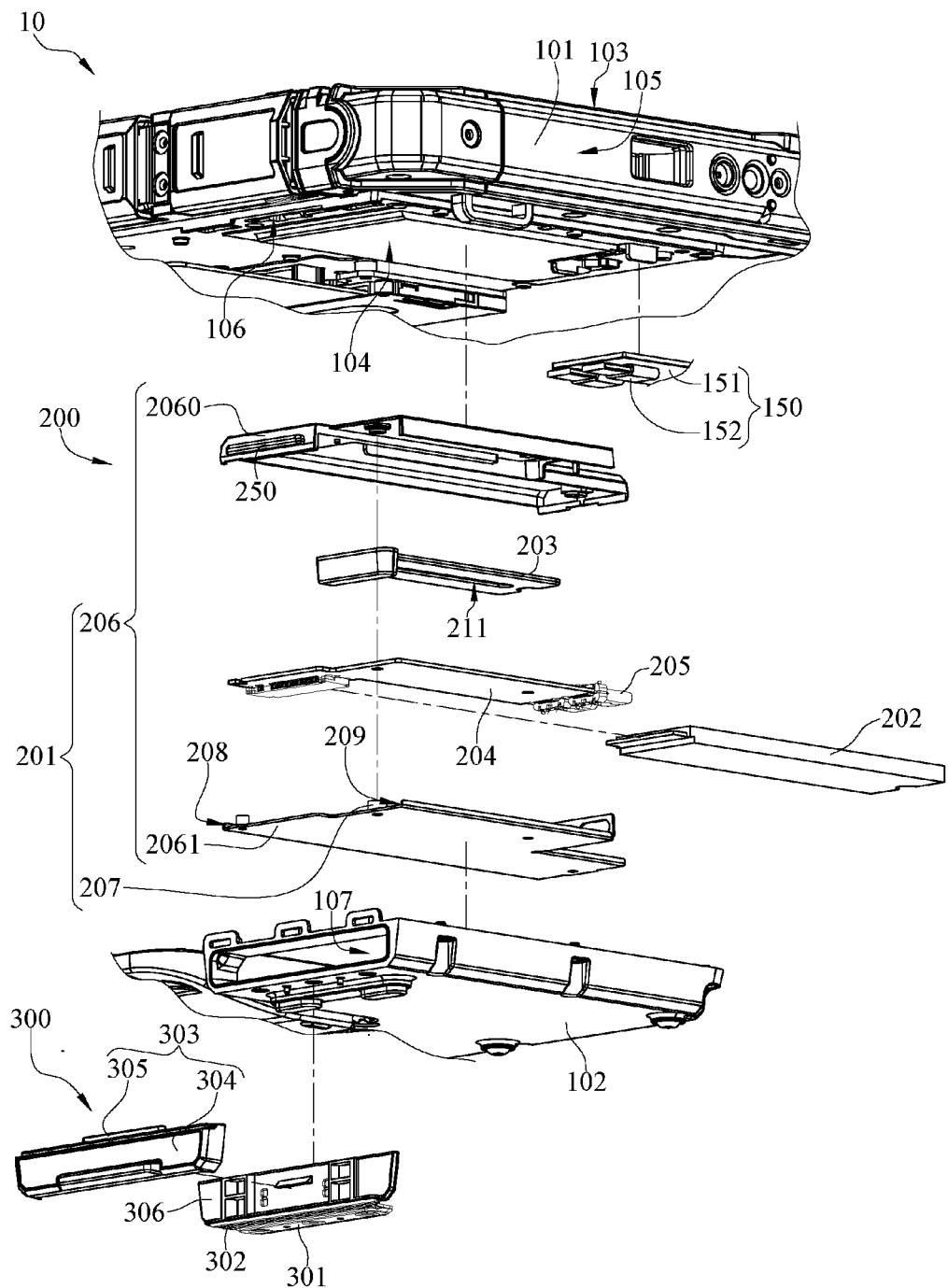
FIG. 2 is an enlarged partial exploded section diagram of the electronic device in FIG. 1.
Figure 3:
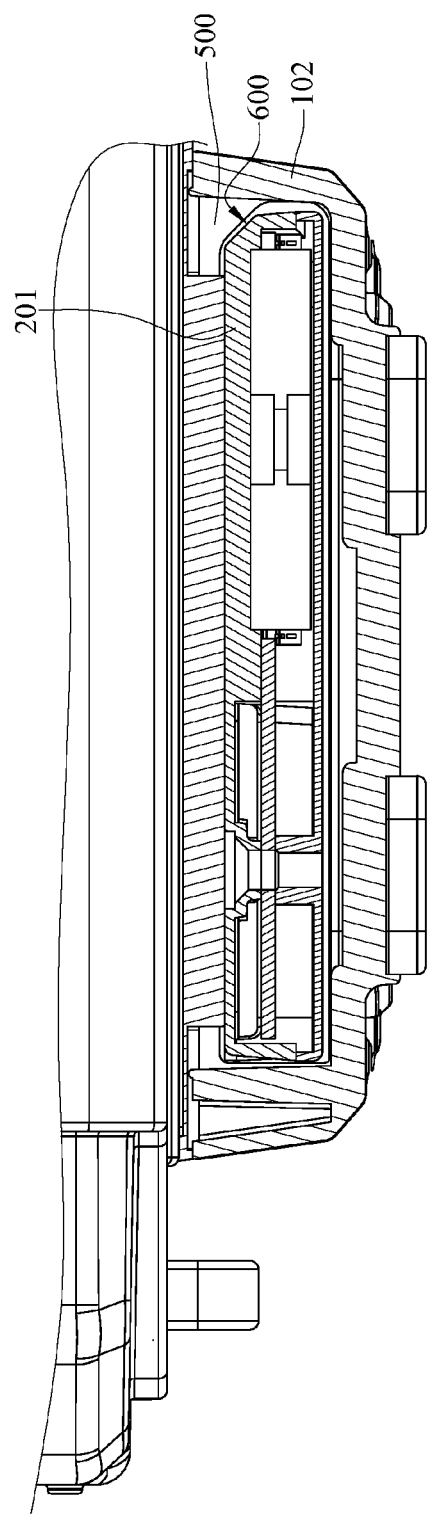
Figure 4:
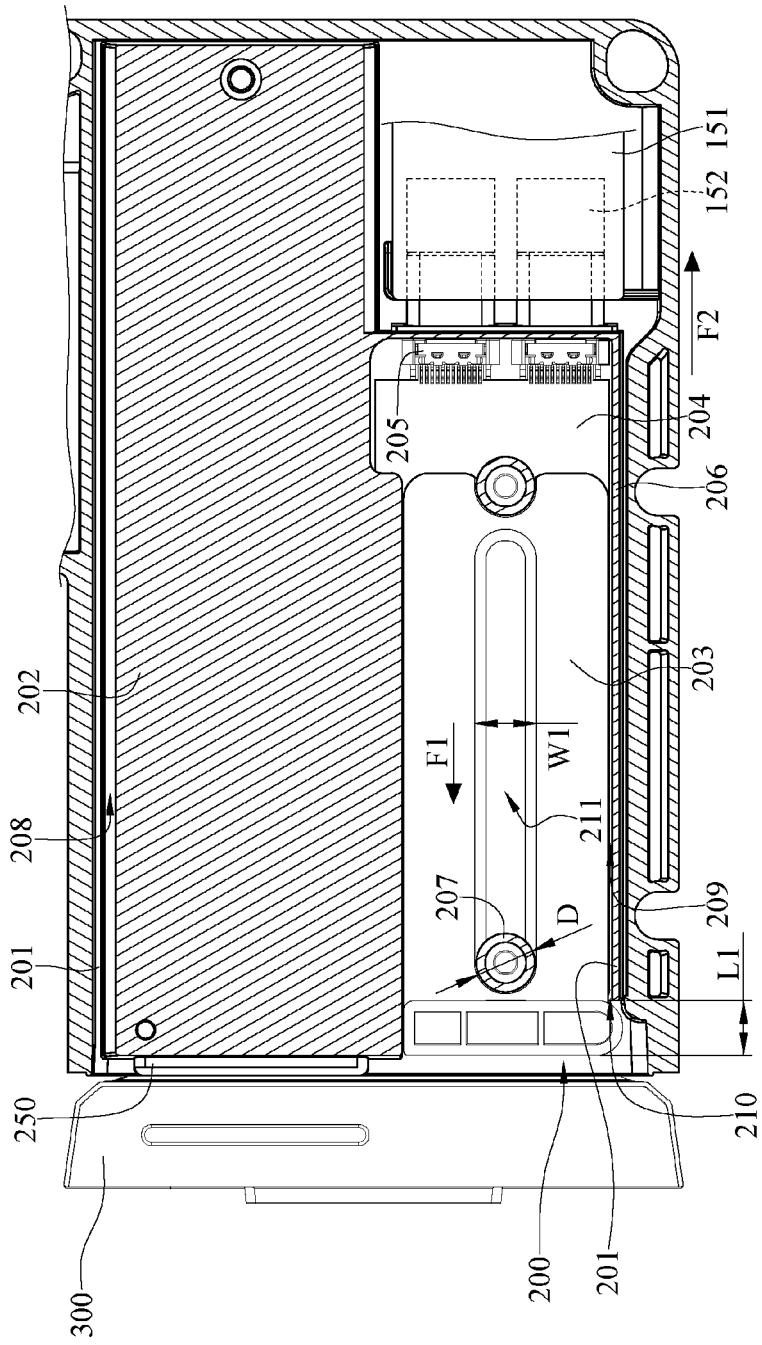
FIG. 4 is an enlarged partial section diagram of the electronic device in FIG. 1 along another section plane.

Refer to FIG. 1 to FIG. 4. FIG. 1 shows an enlarged partial three-dimensional diagram of an electronic device according to an embodiment of the present invention. FIG. 2 shows an enlarged partial exploded section diagram of the electronic device in FIG. 1. FIG. 3 shows an enlarged partial section diagram of the electronic device in FIG. 1. FIG. 4 shows an enlarged partial section diagram of the electronic device in FIG. 1 along another section plane.

In this embodiment, an electronic device 10 includes a host 100, a motherboard 150, a function expansion device 200, a buffer member 250, a smart card installation assembly 260, and a cover 300.

In this embodiment, the host 100 includes a housing 101 and a host casing 102. The housing 101 has a top surface 103, a bottom surface 104, a side surface 105 and a slot 106. The side surface 105 is connected to the top surface 103 and the bottom surface 104, and the top surface 103 is opposite to the bottom surface 104. The slot 106 is located on the bottom surface 104 and is spaced by a distance from the side surface 105.

The host casing 102 is provided in a protruding manner at the housing 101. The host casing 102 and the bottom surface 104 of the housing 101 jointly form an accommodating chamber 107.

The motherboard 150 includes a board 151 and two connectors 152. The two connectors 152 are provided at the board 151 and are located in the accommodating chamber 107 of the host casing 102. The board 151 is provided at the housing 101.

In this embodiment, the function expansion device 200 is detachably accommodated in the accommodating chamber 107, and includes a casing 201, an expansion device 202, a handle 203, an adaptor circuit board 204 and two connectors 205.

In this embodiment, the casing 201 includes a base 206 and a protruding column 207. The base 206 includes an upper cover 2060 and a lower cover 2061. The upper cover 2060 is closer to the housing 101 than the lower cover 2061. The upper cover 2060 and the lower cover 2061 are covered with each other to jointly enclose a main space 208, a side space 209 and an opening 210. The main space 208 and the side space 209 are side by side and are in communication with each other. The opening 210 is in communication with the side space 209. The protruding column 207 protrudes from the base 206 and is located in the side space 209.

Referring to FIG. 3, in this embodiment, the host casing 102 includes a first foolproof structure 500, and the casing 201 includes a second foolproof structure 600. In this embodiment, for example, the first foolproof structure 500 is a foolproof protrusion, and the second foolproof structure 600 is a foolproof recess. More specifically, the first foolproof structure 500 is stacked in the host casing 102 and includes a protruding structure having a guiding slope surface, and the second foolproof structure 600 is a recessed structure formed by removing a part of the casing 201 and includes a slope recess bottom surface. With the configuration above, at least a part of the second foolproof structure 600 needs to be located in the first foolproof structure 500 in order to place the casing 201 in the accommodating chamber 107 of the host casing 102, thus achieving the function of being foolproof. That is to say, the first foolproof structure 500 matches with the second foolproof structure 600, such that the casing 201 is accommodated in the accommodating chamber 107 of the host casing 102.

However, the host casing 102 is not limited to including one first foolproof structure 500 and the casing 201 is not limited to including one second foolproof structure 600. In other embodiments, the host casing may exclude the first foolproof structure, and the casing likewise may exclude the second foolproof structure.

Referring to FIG. 2, the expansion device 202 is accommodated in the main space 208, and is, for example, a solid-state drive; however, the present invention is not limited to the above example. In other embodiments, the expansion device may also be a hard drive of another form. In other embodiments, the expansion device may also be a CD player, a burner, a floppy drive or a rechargeable battery.

Refer to FIG. 2 and FIG. 4. The handle 203 has a sliding channel 211. The protruding column 207 is provided in the sliding groove 211 and allows the handle 203 to be slidably disposed in the side space 209 and the handle 203 to move in a sliding manner along a sliding direction F1 relative to the base 206 by gravitational force. More specifically, the gravitational force received by the handle 203 is greater than the frictional force between the handle 203 and the protruding column 207, such that the handle 203 is allowed to move in a sliding manner relative to the base 206.

Further, in this embodiment, a width W1 of the sliding channel 211 of the handle 203 is, for example but not limited to, greater than equal to a radial diameter D of the protruding column 207. In other embodiments, given that the handle is allowed to move relative to the base by gravitational force via the matching of the sliding channel and the protruding column, the width of the sliding channel may also be smaller than the radial diameter of the protruding column.

In addition, the present invention is not limited to providing the sliding channel 211 at the handle 203 or the protruding column 207 at the base 206 such that the handle 203 is slidably disposed in the side space 209. In other embodiments, the sliding channel may be provided at the base and the protruding column may be provided at the handle, or any other appropriate means may be used to have the handle be slidably disposed in the side space.

The adaptor circuit board 204 is accommodated in the side space 209 of the casing 201 and is electrically connected to the expansion device 202, and the adaptor circuit board 204 is located on one side of the handle 203 away from the housing 101. That is to say, the handle 203 is provided in an original space between the adaptor circuit board 204 and the upper cover 2060, which allows the side space 209 jointly encircled by the upper cover 2060 and the lower cover 2061 to be effectively utilized and facilitates thinning and lightweighting of the electronic device 10.

However, the adaptor circuit board 204 is not limited to being located on one side of the handle 203 away from the housing 101. In other embodiments, the adaptor circuit board may also be located on one side of the handle close to the housing.

The connectors 205 are provided at and electrically connected to the adaptor circuit board 204, and the two connectors 205 of the function expansion device 200 are respectively plugged in the two connectors 152 of the motherboard 150. Further, a plugging direction F2 of the connector 205 is parallel to the sliding direction F1 of the handle 203, which helps the connectors 205 to disengage from the connectors 152 of the motherboard 150 via the handle 203. However, the plugging direction F2 of the connector 205 is not limited to being parallel to the sliding direction F1 of the handle 203. In other embodiments, the plugging direction of the connector of the function expansion device may also be non-parallel to the sliding direction of the handle.

In this embodiment, the buffer member 250 protrudes from the upper cover 2060. However, the function expansion device 200 is not limited to including the buffer 250. In other embodiments, the function expansion device 200 may also exclude the buffer member.

In this embodiment, the smart card installation assembly 260 is provided on the bottom surface 104 of the housing 101, and is for accommodating a smart card (not shown). However, the electronic device 10 is not limited to including the smart card installation assembly 260. In other embodiments, the electronic device may also exclude the smart card installation assembly.

Figure 5:
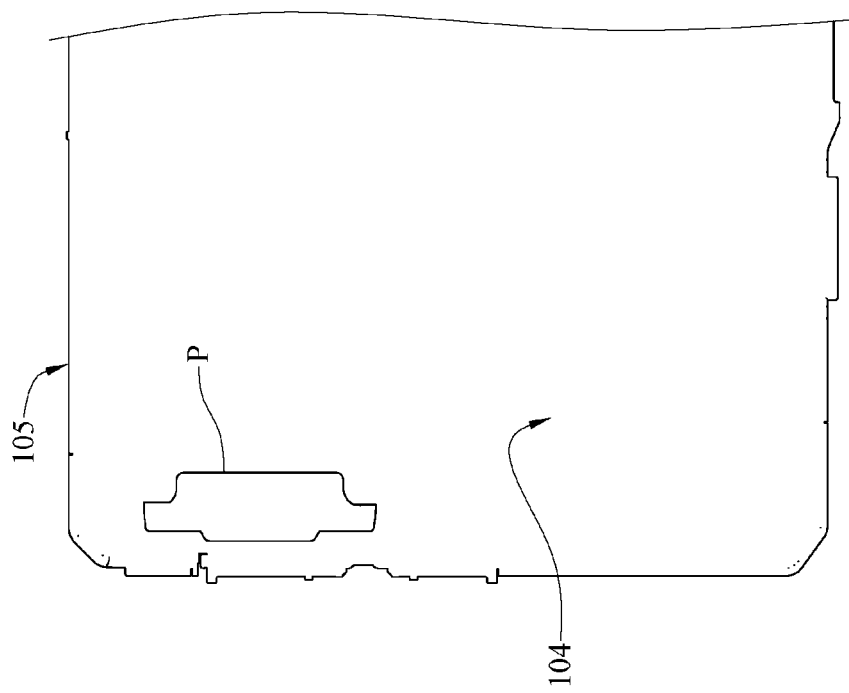
FIG. 5 is a simplified enlarged partial bottom view of a cover and the bottom surface of a host of the electronic device in FIG. 1.
Figure 6:
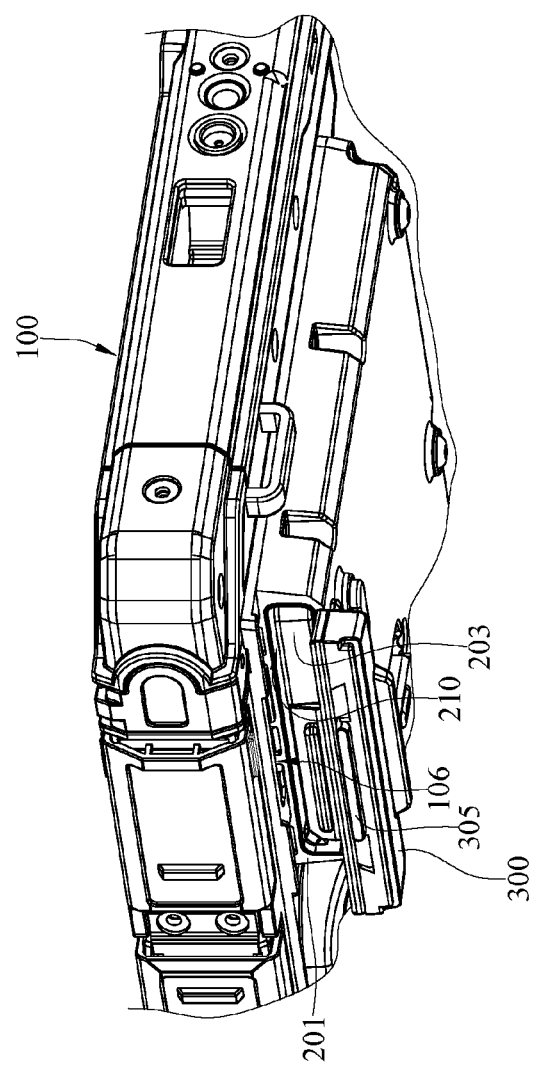
FIG. 6 is a three-dimensional diagram of the electronic device in FIG. 1 when a cover thereof is at an open position.

Refer to FIG. 1, FIG. 2, FIG. 4, FIG. 5 and FIG. 6. FIG. 5 shows a simplified enlarged partial bottom view of the cover and the bottom surface of the host of the electronic device in FIG. 1. FIG. 6 shows a three-dimensional diagram of the electronic device in FIG. 1 when the cover is at an open position.

The cover 300 is movably disposed at the host 100, and has a closed position (as shown in FIG. 1) and an open position (as shown in FIG. 6). More specifically, in this embodiment, the cover 300 includes a fixed portion 301, a bend portion 302, an assembly portion 306 and a cover portion 303. The fixed portion 301 is provided at the host casing 102 of the host 100. In this embodiment, the bend portion 302 is joined with the fixed portion 301 and the assembly portion 306, and can be bent such that the assembly portion 306 is allowed to move in a swinging manner relative to the fixed portion 301. The cover portion 303 includes a body 304 and a fitting protrusion 305. The body 304 is slidably disposed at the assembly portion 306. The fitting protrusion 305 protrudes from the body 304. Thus, the body 304 of the door portion 303 is allowed to move in a swinging manner relative to the fixed portion 301 via the bend portion 302 along with the assembly portion 306. Further, the fitting protrusion 305 is detachably fitted in the slot 106 of the host 100.

As shown in FIG. 1, FIG. 2 and FIG. 4, when the cover 300 is located at the closed position, the fitting protrusion 305 of the cover 300 is fitted in the slot 106 of the host 100 such that the cover 300 blocks the function expansion device 200. Thus, the cover 300 can prevent moisture or dust from entering the accommodating chamber 107 that accommodates the function expansion device 200, further satisfying waterproof and dustproof requirements of the electronic device 10.

Further, as shown in FIG. 1, when the cover 300 is located at the closed position, a sliding direction F3 of the body 304 relative to the fixing portion 301 is, for example but not limited to, parallel to a normal direction N of the bottom surface 104 of the housing 101. In other embodiments, the sliding direction of the body relative to the fixed portion may also be non-parallel to the normal direction of the bottom surface. Moreover, as shown in FIG. 4, when the cover 30 is located at the closed position, the buffer member 250 is sandwiched between the casing 201 and the cover 300 so as to provide a buffer function.

Moreover, as shown in FIG. 1 and FIG. 5, when the cover 300 is located at the closed position, the side surface 105 of the housing 101 encircles a projection P of the cover 300 on the bottom surface 104 of the housing 101. That is to say, the cover 300 is, for example but not limited to, located within the side surface 105. In other embodiments, the cover 300 may also be located outside the side surface.

As shown in FIG. 6, when the cover 300 is located at the open position, the fitting protrusion 305 of the cover 300 is disengaged from the slot 106 of the host 100, such that the handle 203 is exposed to the outside via the opening 210 of the casing 201.

In this embodiment, the slot 106 and the side surface 105 are spaced by a distance, and when the cover is located at the closed position, the sliding direction F3 of the body 304 is parallel to the normal line N of the bottom surface 104 and the cover 300 is located within the side surface 105. Thus, when the cover 300 is located at the closed position, the electronic device 10, receiving impact regardless of any angle, does not cause the cover 300 to unexpectedly move from the closed position to the open position.

Figure 7:
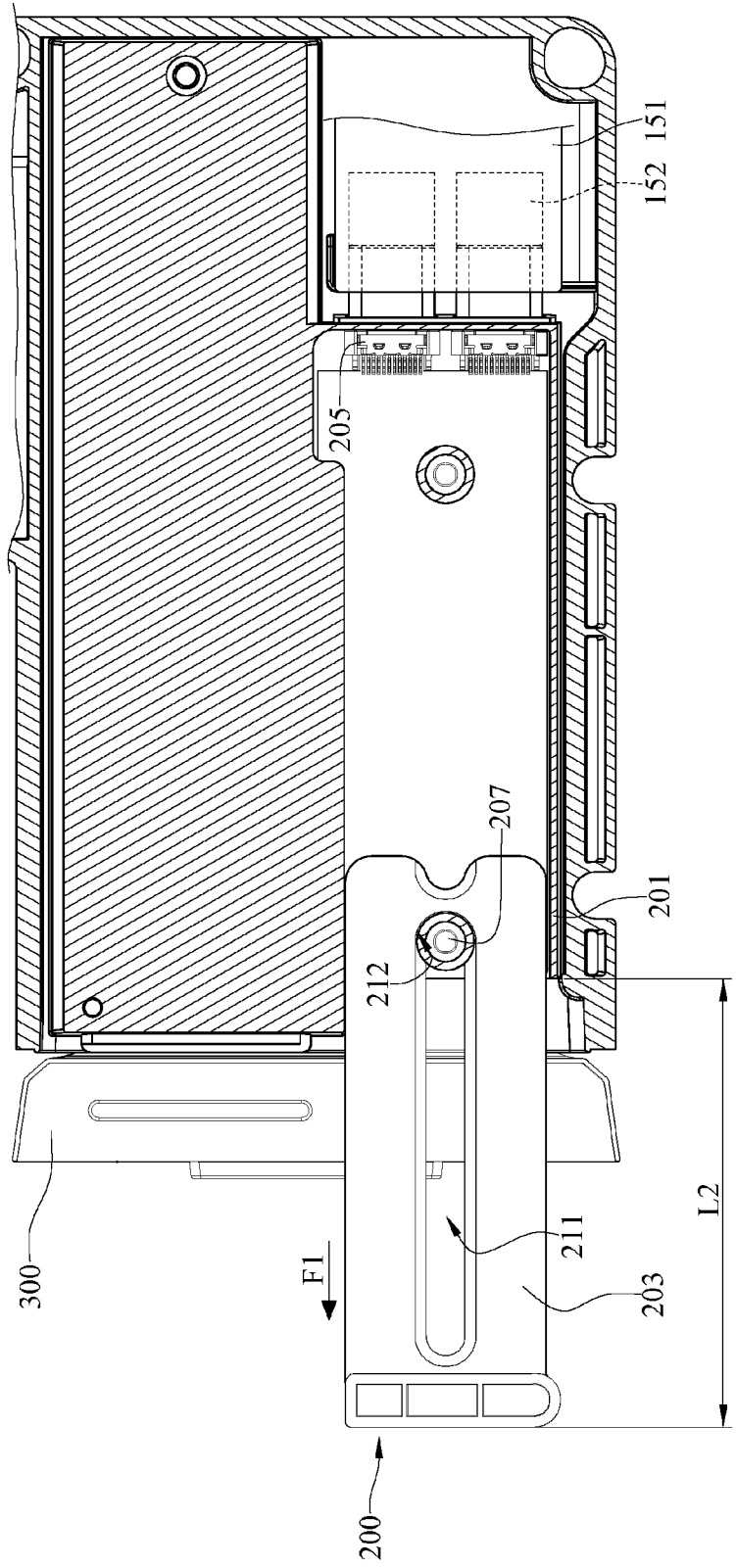
FIG. 7 is a section schematic diagram of the electronic device in FIG. 1 when a handle of a function expansion device thereof is at an extracted position.
Figure 8:
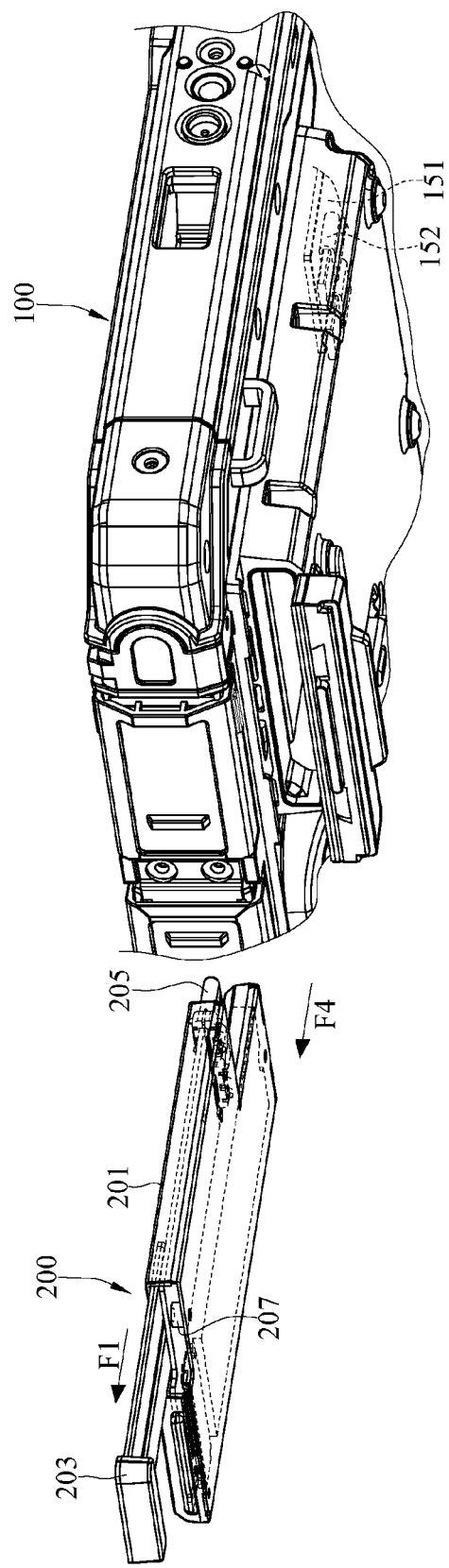
FIG. 8 is a three-dimensional diagram of the electronic device in FIG. 1 when a function expansion device thereof is separated from a host.

Refer to FIG. 2, FIG. 4, FIG. 7 and FIG. 8. FIG. 7 shows a section schematic diagram of the electronic device in FIG. 1 when the handle of the function expansion device is at an extracted position. FIG. 8 shows a three-dimensional diagram of the electronic device in FIG. 1 when the function expansion device is separated from the host. In this embodiment, the handle 203 has a housed position (as shown in FIG. 4) and an extracted position (as shown in FIG. 7).

As shown in FIG. 4, when the handle 203 is located at the housed position, the connectors 205 of the function expansion device 200 are plugged in the connectors 152 of the motherboard 150, and the handle 203 has a first protruding length L1 relative to the casing 201. Further, when the handle 203 is located at the housed position and the cover 300 is located at the closed position, the cover 300 prevents the handle 203 from disengaging from the side space 209 due to gravitational force.

As shown in FIG. 7, when the cover 300 moves to the open position, the handle 203 is allowed to move from the housed position to the extracted position along the sliding direction F1 by gravitational force. That is to say, when the cover 300 moves to the open position, the handle 203 is capable of moving from the housed position to the extracted position along the sliding force F1 merely by gravitational force, without being pulled at all. When the handle 203 is located at the extracted position, the handle 203 has a second protruding length L2 relative to the casing 201. Further, the first protruding length L1 is less than the second protruding length L2. In addition, when the handle 203 is located at the extracted position, the protruding column 207 of the casing 201 is pressed against the handle 203 to form a wall surface 212 of the sliding channel 211, enabling the casing 201 to move along with the handle 203. Moreover, as shown in FIG. 7, when the handle 203 is moved to the extracted position by merely gravitational force but not yet pulled, the connectors 205 of the function expansion device 200 are still kept in a state of being plugged in the connectors 152 of the motherboard 150.

For an electronic device having thinning and lightweighting features, it is difficult for fingers of the user to extend into the accommodating chamber 107 to operate the handle 203. Further, in this embodiment, a user is allowed to move the handle 203 from the housed position to the extracted position by gravitational force produced by facing the opening 210 downward, without having to manually operate the handle 203. Thus, the handle 203 of this embodiment in particular provides a thin and lightweight electronic device with convenience for removing/installing the expansion device 20.

As shown in FIG. 8, when the handle 203 is further pulled along a detaching direction F4 parallel to the sliding direction F1, the handle 203 drives the casing 201 by the protruding 207 to disengage from the accommodating chamber 107 of the host casing 102, such that the connectors 205 of the function expansion device 200 are separated from the connectors 152 of the motherboard 150, further removing the function expansion device 200 from the host 100.

In the electronic device and the function expansion device according to the above embodiments, the handle is slidably disposed in the side space and is allowed to move between the housed position and the extracted position relative to the casing by gravitational force, and thus the handle can be moved from the housed position to the extracted position without being pulled and can further move the casing that accommodates the expansion device. Therefore, the removal/installation process of the expansion device does not require a tedious process of detaching/locking multiple screws, enabling the function expansion device to satisfy the need of convenient removal/installation of the expansion device.

Further, because a user is allowed to move the handle from the housed position to the extracted position by gravitational force without having to manually operate the handle, the handle can provide a lightweight and thin electronic device with convenience in removing/installing the expansion device.

Moreover, the cover blocks the function expansion device when located at the closed position, and so the cover is capable of preventing the handle from moving unexpectedly from the housed position to the extracted position. In addition, the cover that blocks the function expansion device also prevents alien objects such as moisture or dust from entering the casing via the opening of the casing and hence from affecting the operation of the function expansion device.

While the invention has been described by way of example and in terms of the embodiments, it is to be understood that the invention is not limited thereto. Some changes and modifications can be made by a person skilled in the art without departing from the spirit and scope of the present invention. Therefore, the scope of the protection scope of the present invention should be accorded with the broadest interpretation of the appended claims.

What is claimed is:

1. A function expansion device, comprising:
a casing, having a main space and a side space;
an expansion device, accommodated in the main space of the casing; and
a handle, slidably disposed in the side space and configured to allow movement between a housed position and an extracted position along a sliding direction relative to the casing by gravitational force;
wherein, a first protruding length of the handle when the handle is located at the housed position is less than a second protruding length of the handle relative to the casing when the handle is at the extracted position, and when the handle is at the extracted position, the handle is pressed against the casing to enable the casing to move along with the handle;
configured such that the gravitational force received by the handle is greater than the frictional force between the handle and the protruding column.

2. The function expansion device according to claim 1, wherein the casing comprises a base and a protruding column, the base encloses the main space and the side space, the protruding column protrudes from the base and is located in the side space, the handle comprises a sliding channel, the protruding column is provided in the sliding channel to allow the handle to be slidably disposed in the side space, and when the handle is at the extracted position, the protruding column presses in the handle to form a wall surface of the sliding channel and to allow the casing to move along with the handle.

3. The function expansion device according to claim 2, wherein a width of the sliding channel of the handle is greater than or equal to a radial diameter of the protruding column.

4. A function expansion device, comprising:
a casing, having a main space and a side space;
an expansion device, accommodated in the main space of the casing;
a handle, slidably disposed in the side space and allowed to move between a housed position and an extracted position along a sliding direction relative to the casing by gravitational force; and
a connector;
wherein, a first protruding length of the handle when the handle is located at the housed position is less than a second protruding length of the handle relative to the casing when the handle is at the extracted position, and when the handle is at the extracted position, the handle is pressed against the casing to enable the casing to move along with the handle; and
a plugging direction of the connector is parallel to the sliding direction of the handle.

5. The function expansion device according to claim 4, further comprising:
an adaptor circuit board, the adaptor circuit board is accommodated in the side space of the casing and is electrically connected to the expansion device, wherein the connector is provided at and electrically connected to the adaptor circuit board.

6. The function expansion device according to claim 5, wherein the casing comprises a base and a protruding column, the base encloses the main space and the side space, the protruding column protrudes from the base and is located in the side space, the handle comprises a sliding channel, the protruding column is provided in the sliding channel to allow the handle to be slidably disposed in the side space, and when the handle is at the extracted position, the protruding column presses in the handle to form a wall surface of the sliding channel and to allow the casing to move along with the handle.

7. The function expansion device according to claim 6, wherein a width of the sliding channel of the handle is greater than or equal to a radial diameter of the protruding column.

8. An electronic device, comprising:
a host, comprising an accommodating chamber and a slot;
a function expansion device, detachably accommodated in the accommodating chamber, comprising:
a casing, having a main space, a side space and an opening, the opening being in communication with the side space;
an expansion device, accommodated in the main space of the casing; and a handle, slidably disposed in the side space and allowed to move between a housed position and an extracted position along a sliding direction relative to the casing by gravitational force; wherein, a first protruding length of the handle when the handle is located at the housed position is less than a second protruding length of the handle relative to the casing when the handle is at the extracted position, and when the handle is at the extracted position, the handle is pressed against the casing to enable the casing to move along with the handle; and a cover, movably disposed at the host, and having an open position and a closed position, the cover being fitted in the slot of the host to block the function expansion device when the cover is located at the closed position, the cover being disengaged from the slot of the host to have the handle be exposed to outside via the opening of the casing when the cover is located at the open position.

9. The electronic device according to claim 8, wherein the host further comprises a top surface, a bottom surface and a side surface, the side surface is connected to the top surface and the bottom surface and the top surface is opposite to the bottom surface, the accommodating chamber is located at the bottom surface of the host, the slot is located at the bottom surface and is spaced from the side surface by a distance, and the side surface encircles a projection of the cover on the bottom surface when the cover is located at the closed position.

10. The electronic device according to claim 9, wherein the cover comprises a fixed portion and a cover portion, the cover portion comprises a body and a fitting protrusion, the fitting protrusion protrudes from the body, the fixed portion is provided at the host, the body is slidably disposed at the fixed portion, the fitting protrusion is detachably fitted in the slot of the host, and when the cover is located at the closed position, a sliding direction of the body relative to the fixed portion is parallel to a normal direction of the bottom surface.

11. The electronic device according to claim 8, wherein the host comprises a first foolproof structure, the casing further comprises a second foolproof structure, and the first foolproof structure matches with the second foolproof structure to allow the casing to be accommodated in the accommodating chamber of the host.

12. The electronic device according to claim 8, wherein the function expansion device further comprises an adaptor circuit board, the adaptor circuit board is accommodated in the side space of the casing and is electrically connected to the expansion device, and the adaptor circuit board is located on one side of the handle away from the host.

13. The electronic device according to claim 12, wherein the function expansion device further comprises a connector, the connector is provided at and electrically connected to the adaptor circuit board, and a plugging direction of the connector is parallel to the sliding direction of the handle.

14. The electronic device according to claim 8, further comprising:

a buffer member, protruding from the casing, the buffer member being sandwiched between the casing and the cover when the cover is located at the closed position.

15. The electronic device according to claim 8, wherein the casing comprises a base and a protruding column, the base encloses the main space and the side space, the protruding column protrudes from the base and is located in the side space, the handle comprises a sliding channel, the protruding column is provided in the sliding channel to allow the handle to be slidably disposed in the side space, and when the handle is at the extracted position, the protruding column presses in the handle to form a wall surface of the sliding channel and to enable the casing to move along with the handle.

16. The electronic device according to claim 15, wherein a width of the sliding channel of the handle is greater than or equal to a radial diameter of the protruding column.

17. The electronic device according to any one of claim 8, wherein the host comprises a housing and a host casing, the host casing is provided in a protruding manner at the housing, the accommodating chamber is located at the host casing, and the slot is located at the housing.

* * * * *